United States Patent
Sundareswaran et al.

(10) Patent No.: US 9,465,899 B2
(45) Date of Patent: Oct. 11, 2016

(54) METHOD FOR PROVISIONING DECOUPLING CAPACITANCE IN AN INTEGRATED CIRCUIT

(71) Applicant: Freescale Semiconductor, Inc., Austin, TX (US)

(72) Inventors: Savithri Sundareswaran, Austin, TX (US); Benjamin S. Huang, Austin, TX (US); Ravi K. Vaidyanathan, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 0 days.

(21) Appl. No.: 13/837,565

(22) Filed: Mar. 15, 2013

(65) Prior Publication Data
US 2014/0282340 A1  Sep. 18, 2014

(51) Int. Cl.
*G06F 17/50* (2006.01)

(52) U.S. Cl.
CPC ....... *G06F 17/5072* (2013.01); *G06F 2217/82* (2013.01)

(58) Field of Classification Search
USPC ....................................................... 716/100
See application file for complete search history.

(56) References Cited

U.S. PATENT DOCUMENTS

| | | | |
|---|---|---|---|
| 6,898,769 B2* | 5/2005 | Nassif et al. | 716/115 |
| 6,904,584 B2* | 6/2005 | Brenner et al. | 716/122 |
| 7,571,404 B2* | 8/2009 | Zhao et al. | 716/106 |
| 7,600,208 B1* | 10/2009 | Sharma et al. | 716/120 |
| 7,709,301 B2* | 5/2010 | Bosshart | 438/129 |
| 7,859,024 B2 | 12/2010 | Bosshart | |
| 2003/0212973 A1* | 11/2003 | Lin et al. | 716/6 |
| 2004/0073881 A1* | 4/2004 | Nassif et al. | 716/10 |
| 2008/0134103 A1* | 6/2008 | Zhao et al. | 716/2 |
| 2008/0244497 A1* | 10/2008 | Zhao et al. | 716/14 |
| 2008/0251888 A1* | 10/2008 | Agarwal et al. | 257/532 |

OTHER PUBLICATIONS

Meng, Xiongfei et al., "Layout of Decoupling Capacitors in IP Blocks for 90-nm CMOS", Oct. 21, 2008, Very Large Scale Integration (VLSI) Systems, IEEE Transactions on (vol. 16, Issue: 11), pp. 1581-1588.*

* cited by examiner

*Primary Examiner* — Bryce Aisaka (57) ABSTRACT

A method of provisioning an integrated circuit with decoupling capacitance includes identifying in an initial design of the integrated circuit lacking decoupling elements, a standard cell instance satisfying a transient power or frequency switching criteria. Based on a transient power characteristic of the standard cell instance, a decoupling capacitance requirement for the standard cell instance is determined. The decoupling capacitance requirement indicates a capacitance sufficient to bring the standard cell instance into compliance with a stability constraint on a supply voltage node of the standard cell instance. A decoupling capacitor satisfying the decoupling capacitance requirement is provisioned by appending an appropriate sized decap transistor having one or more gate electrode elements to the standard cell instance. The size of the decap transistor may be derived from the required decoupling capacitance, the amount of decoupling capacitance contributed by each gate electrode element, and the area required for each gate electrode element.

20 Claims, 5 Drawing Sheets

METHOD FOR PROVISIONING DECOUPLING CAPACITANCE IN AN INTEGRATED CIRCUIT

BACKGROUND

1. Field

Disclosed subject matter is in the field of semiconductor design and, more specifically, the use and implementation decoupling capacitors in standard cell designs.

2. Related Art

The use of decoupling capacitors in the design of electronic devices, including semiconductor devices designed using a library of standard cells, to achieve a more stable power state is well known. For example, some design methodologies may add decoupling capacitors across an entire device in a manner that is opportunistic with respect to available space within the design. Other approaches may tile decoupling capacitors uniformly across an entire device. While these and other approaches may be relatively simple to implement, they may not be optimal in terms of the amount of transient immunity they provide or the amount of device real estate dedicated.

BRIEF DESCRIPTION OF THE DRAWINGS

The present invention is illustrated by way of example and is not limited by the accompanying figures, in which like references indicate similar elements. Elements in the figures are illustrated with an emphasis on clarity and simplicity where possible and have not necessarily been drawn to scale.

DETAILED DESCRIPTION

The design of the semiconductor circuits using cell-based methodology is well known. Cell-based design refers to a design paradigm in which a design imports basic and commonly required functional elements from a pre-existing database, often referred to as a standard cell library, of such elements, which are often referred to as cells, library cells, or standard cells. As used herein, a standard cell refers to a predefined physical implementation of a set of transistors, interconnects, and other circuit elements that provide a defined function such as a Boolean logic function, a latching function, e.g., a flip-flop or latch, a clock signal function, or another suitable function. Cell-based design speeds the design process and enables a designer to focus on functional aspects of a desired device without getting bogged down in transistor level physical implementation.

Certain types of standards cells might be characterized as noisy cells. A noisy cell might be generally characterized as a cell that generates relatively large current and/or power consumption spikes or transients relatively frequently. Generally, noisy cells correlate to cells that exhibit relatively high switching frequency. Examples of standard cells likely to be noisy cells include clock buffers and sequential cells, due to switching activity in every clock cycle. Current spikes associated with switching activity current can produce undesirable voltage fluctuations, sometimes referred to voltage drop. Voltage drop can manifest itself as increased delay and increased on-chip voltage variations.

Decoupling capacitors are used to reduce voltage drop associated with current transients and other switching activity. As indicated above, conventional methodologies for incorporating decoupling capacitors into a cell based design include opportunistic decoupling, in which decoupling capacitors are added to available or unoccupied regions of a layout, and uniform decoupling, in which decoupling capacitors are tiled uniformly across a design. Uniform and opportunistic decoupling are generally inefficient because they are simultaneously both over-inclusive and under-inclusive. Conventional decoupling is generally over-inclusive because many cells are not sufficiently noisy to benefit from the added size of a decoupling capacitor. Conventional decoupling is also under-inclusive because decoupling capacitors, which have a relatively small radius of influence, may not be located sufficiently close to noisy cells to provide significant benefit. In other words, decoupling capacitors need to be as close as possible to standard cells that generate significant transients, but need not be included at all with respect to standard cells that are relatively quiet.

Subject matter disclosed herein incorporates decap transistors in the design of an integrated circuit by identifying standards cells satisfying a switching activity criteria or other criteria indicative of significant current transients. These criteria are intended to identify instances of standard cells that would most benefit from the inclusion of a decoupling capacitor. Once the noisy cells within a design have been selected or identified based on the criteria specified, the identified cells are modified to incorporate decoupling capacitors having sufficient capacitance to bring the corresponding standard cell into compliance with a defined constraint including, as an example, a defined constraint on the maximum permitted voltage variation associated with a supply voltage node of the standard cell instance. The decoupling capacitors may be added systematically to instances of standard cells by employing appending decap transistors to one or more sides of the standard cell layout and thereby form a modified standard cell instance or decoupled standard cell instances. Because the decoupling capacitors are integrated into corresponding standard cell instances, there is no need to add external or distinct decoupling elements to the design.

Incorporating decap transistors into a standard cell design beneficially results in an overall cell area that is less than the area that would be required to incorporate stand-alone decap transistors around or near the specific cells. In addition, by localizing decap transistors in close proximity to the standard cells that most need and most benefit from the integration of a decap transistor, the resulting device is more robust to current transients and has less variability and performance characteristics.

Design methodologies disclosed herein may encompass a number of components including the selection of cells that exhibit high switching activity. Cells that are likely to exhibit the switching activity contemplated include clock buffer cells and sequential cells. Generally, any cell that receives a clock signal as one of its inputs and must, therefore, transition, at least in some fashion, every clock cycle, may qualify as a cell that would meet the switching activity criteria or other suitable decoupling criteria.

After identifying standards cell instances that need decoupling, the size of the decoupling capacitance required is determined for each of the identified standard cell instances. For example, a wider or bigger clock buffer that draws more current would require more decoupling capacitance. After the decoupling capacitance for a given standard cell instance is determined, the capacitance may be translated into a number of gates elements needed where the number of gates elements determines the amount of capacitance.

After determining the size of the decap transistor and the corresponding number of transistor gates structures required, the cell boundary to which the decap transistor can be appended may be determined. With respect to embodiment in which standard cells include transistor gate elements of polysilicon or another suitable material arranged in parallel or otherwise in order between a first boundary and a second boundary, decap transistors can be appended to either boundary or to both boundaries. The standard cell instance may then be extended to include a decap transistor on one or more boundaries.

The techniques described for provisioning an initial design such as a design entirely or substantially lacking in decoupling elements, with decoupling capacitors may be implemented in the context of an electronic design automation (EDA) environment or another environment in which circuits and logical and transistor level representations of an integrated circuit are stored as data structures in one or more databases. In these environments, embodiments of the disclosed methodologies may operate on an initial design of an integrated circuit that is stored in an electronic design automation database and referred to herein as the initial design representation or, more simply, the initial design. The initial design may, in some embodiments, lack any decap transistors or other type of decoupling capacitors, and include instead only the sequential and functional or logical elements required to implement the functionality for which the integrated circuit is designed. In some of these embodiments, the disclosed methodologies operate on an initial design that lacks decoupling capacitors and generates a modified design or optimized design, which may be stored in the same database or a different database, and includes, in addition to the sequential and logical elements of the initial design, decoupling capacitors selectively integrated into standard cell instances in the initial design that exhibit significant switching activity or may be otherwise characterized as noisy.

In some embodiments, a standard cell includes a number of gate electrodes structures are arranged in parallel separated by a common displacement and having the same end to end length. These gate electrode elements are designed in conjunction with active or source/drain regions to produce transistor functionality. In these embodiments, a decap transistor can be integrated into the standard cell instance by adding one or more gate electrode elements to one or both ends of the standard cell. Each gate electrode element that is added provides additional capacitance approximately proportional to the area of the gate electrode element.

Electrically, decap transistors disclosed herein include floating gate decap transistors and biased gate floating transistors. In a biased-gate decap transistor, the gate electrode may be biased, e.g., connected to the supply voltage (VDD), while the transistor's source and drain regions are shorted together and connected to ground (VSS). Other embodiments of biased gate decap transistors may employ polarities opposite of those described. In a floating gate decap transistor, the gate electrode element is unbiased and traverses an n-type active region and a p-type active region. The n-type active regions is biased to VDD while the p-type active is biased to VSS. In this configuration, the decap transistor may be modeled as a pair of capacitors in series, with the gate electrode element servicing as a small resistor connected between the two capacitors. Whereas the biased gate decap transistor offers more capacitance/area than a floating gate decap transistor, the biased gate decap transistor requires a contact to the gate electrode element that increase the size of the decap.

Figure 1:
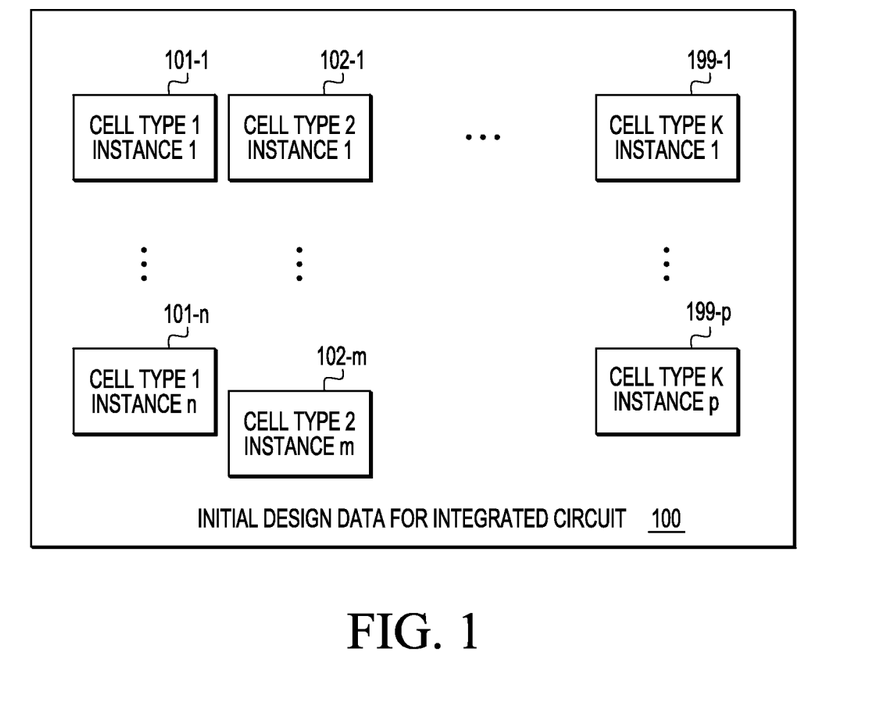
FIG. 1 is a block diagram representation of selected elements of an embodiment of a standard cell semiconductor device.

Turning now to the drawings, FIG. 1 depicts selected elements of an initial design 100 of a semiconductor device or other form of integrated circuit. Initial design 100 represents a data structure containing information indicating a design of the integrated circuit. In some embodiments, initial design 100 as depicted in FIG. 1 FIG. 1 includes sequential, functional, and logical elements of the integrated circuit, but lacks or substantially lacks any decoupling capacitors or other decoupling elements. Initial design 100 may be stored in an EDA database and accessed and transformed or otherwise modified using an EDA application. It should be noted that the electronic design of an integrated circuit is not a process that could be reasonably performed manually or on paper without the aid of a data processing system or other type of computer programmed with the EDA application. Depending upon the implementation, the initial design could be in the form of a transistor level representation of the integrated circuit, a functional block diagram of the integrated circuit, a physical layout of the integrated circuit, or a combination thereof.

As suggested by FIG. 1, initial design 100 includes a plurality of instances of various standards cells. Thus, as depicted in FIG. 1, initial design 100 includes "n" instances 101-1 through 101-*n* of a first standard cell type, "m" instances 102-1 through 102-*m* of a second cell type, and "p" instances 199-1 through 199-*p* of a K-th cell type. The number of cell types available for inclusion in initial design 100 is a function of the cell library that a designer has access to and may vary according to other factors. The number of instances of each cell type is likewise implementation specific and depends, at least in part, upon the specific function for which the integrated circuit is designed.

The various types of cells that are contemplated for inclusion in initial design 100 as depicted in FIG. 1 may include, as an example, logical standard cells such as a 2-input nand gate. Another type of standard cell is a sequential cell or memory cell, wherein a flip-flop or other type of latching circuit that has an output state determined by that state of its input at a specific point in time, e.g., the point in time at which a clock signal last made a specified transition, and that retains the output state until a specific point in time in the future, e.g., until the next transition of the clock signal. Initial design 100 may further include a clock buffer circuit that receives a clocking signal and generates one or more substantially similar or related clocking signals to drive the various logical and sequential elements.

As indicated previously some types of standards cells are prone to exhibit higher transient current activity due to higher switching activity. As discussed previously, an aspect of the disclosed subject matter includes identifying standards cell types and/or instances of those cell types that would most benefit from the inclusion of decoupling capacitors. Thus, an aspect of the disclosed subject matter includes establishing or applying a criteria to identify standard cell instances within an initial design that satisfy a switching criteria or otherwise qualify for inclusion of a decoupling capacitor. In some cases, the selection of standard cell instances may be performed on for each cell instance individually. For example, a first instance of a cell type may be selected for including a decoupling capacitor while a second instance of the same subtype may be excluded from decoupling capacitor inclusion based on a simulated or otherwise estimated value of the current and current switching activity of the two cell instances. In other implementations, the selection of cells for including decoupling capacitors may be performed on a cell type basis, for example, all instances of a first cell type may be selected for including a decoupling capacitor while all instances of a second cell type are determined not to qualify for including a decoupling capacitor.

Figure 2:
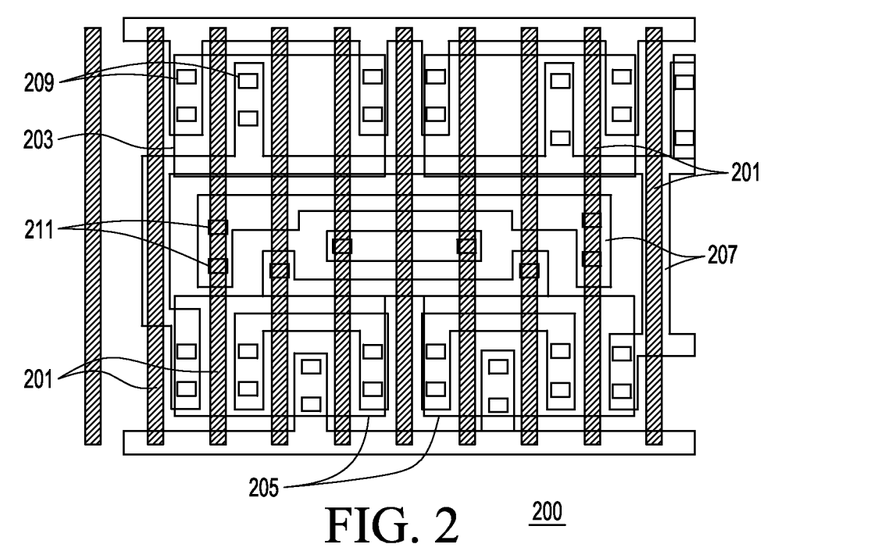
FIG. 2 depicts selected elements of an embodiment of a layout of a standard cell instance prior to implementing any decoupling capacitors.

Turning now to FIG. 2, a representative example of a physical layout of a standard cell 200 is depicted. In the embodiment depicted in FIG. 2, standard cell 200 includes a plurality of gate electrode elements 201, a plurality of active regions or source/drain regions 203, and a plurality of metallization elements 207. In the embodiment depicted in FIG. 2, a single layer of metallization is represented. In other embodiments, the metallization elements 207 may be distributed among two or more metallization levels. Standard cell 200, it should be noted, lacks any distinct or explicitly defined electrical decoupling features.

As depicted in FIG. 2, standard cell 200 further includes a plurality of gate electrode elements 201, each of which is of a standard width and length, is separated by a common displacement from its neighboring gate electrode elements, and traverses the underlying active regions 203 and 205. This configuration of a standard cell will be familiar to those in the field of semiconductor design. Although standard cell design methodology may incorporate standard cells in which the gate electrode elements are not uniformly sized or spaced, the embodiment depicted in FIG. 2 is representative of standard cells and is described herein for purposes of simplicity. The concepts described for implementing decoupling transistors into standard cell 200 are amenable to standard cells that may employ gate electrodes of different sizes and spacings. As will be familiar to those knowledgeable and semiconductor devices, the configuration of gate electrode 201, active regions 203 and 205, metallization elements 207, and interconnects or contacts 209 and 211 enable designers to interconnect the gate, drain, and source terminals of two or more transistors as desired to implement a desired function.

Figure 3:
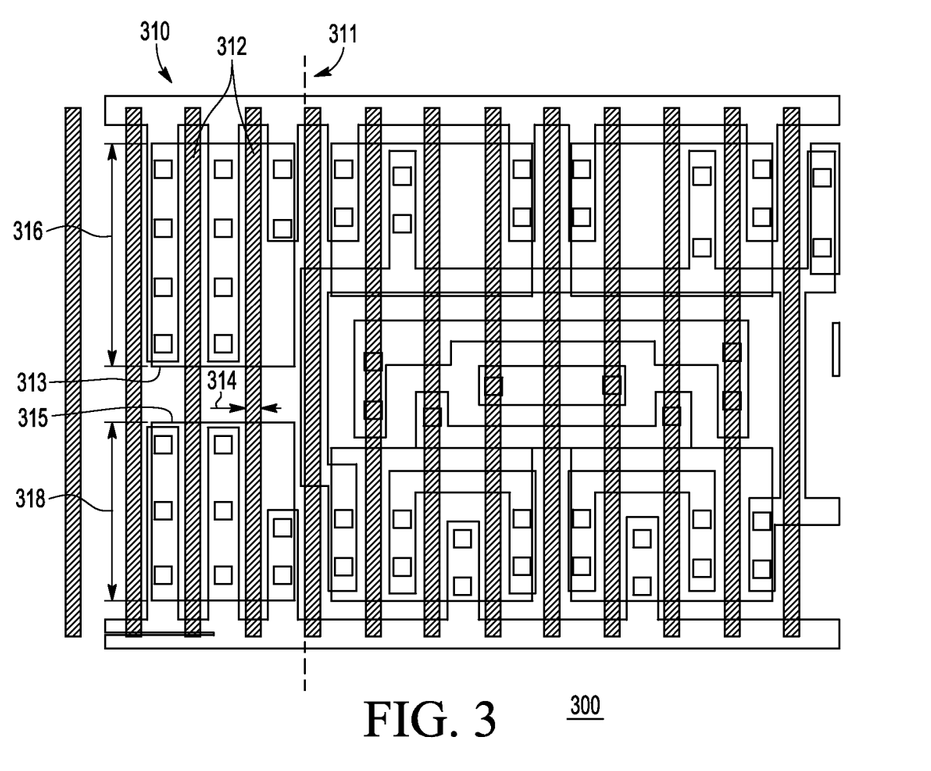
FIG. 3 depicts the standard cell instance of FIG. 2 after incorporating a decoupling transistor.

Turning now to FIG. 3, a representative example of a modified standard cell instance 300 according to the decoupling methodology described herein is depicted. In the embodiment depicted in FIG. 3, the standard cell 200 of FIG. 2 has been modified to create modified standard cell 300 by the inclusion of a decap transistor 310 at a left boundary 311 of standard cell 300. Other than the inclusion of decap transistor 310, modified standard cell instance 300 is functionally equivalent and substantially identical to standard cell instance 200 as depicted in FIG. 2. A boundary line 311 depicted in FIG. 3 separates or identifies the boundaries between the elements of modified cell 300 that represent or correspond to standard cell 200 and the integrated decap transistor 310. As depicted in FIG. 3, the decap transistor 310 is appended to the left boundary 311, of the standard cell instance, other embodiments may append a decap transistor to a right-side boundary of the standard cell instance. In still other embodiments, modified standard cell instance 300 may include a decap transistor 310 appended to both a left boundary and a right boundary of the applicable cell. IN addition, although the configuration of standard cell instance 200 is amenable to appending decap transistors to the left or right of the standard cell instance, other configuration may be suitable for appending standard cells to a top or bottom boundary or to any combination of left, right, top, and bottom boundaries.

As depicted in FIG. 3, decap transistor 310 includes two gate electrode elements 312, each of which traverses a first active region 313 and a second active region 315. The number of gate electrode elements of a decap transistor may vary according to the capacitance required to decouple the standard cell instance. As used herein, decoupling a cell refers may refer to providing sufficient decoupling to prevent a voltage supply node of the standard cell instance from varying more than a specified threshold, e.g., 10%. Each additional gate electrode structure 312 increases the capacitance of the decap transistor by an amount roughly proportional to the area of gate electrode structure 312 and, more specifically, the area of the gate electrode structure overlying an active region 313 or 315.

The decap transistor 310 depicted in FIG. 3 is an example of a floating gate decap transistor. Other implementations of decap transistor 310 may include biased gate decap transistors (not depicted in FIG. 3). A floating gate decap transistor such as decap transistor 310 may include an p-type active region 313 connected to VSS, an n-type active region 315 connected to VDD, and one or more gate electrode elements 313 that overlie and traverse the active regions 313 and 315 underlying. Gate electrode elements 312 of FIG. 3 are referred to as floating gate elements because no metallization contacts are made to gate electrode structures 312. Although not depicted in FIG. 3, a biased gate decap transistor may include a gate electrode structure connected, through metallization, to VDD with the source/drain regions shorted together and grounded.

Figure 4:
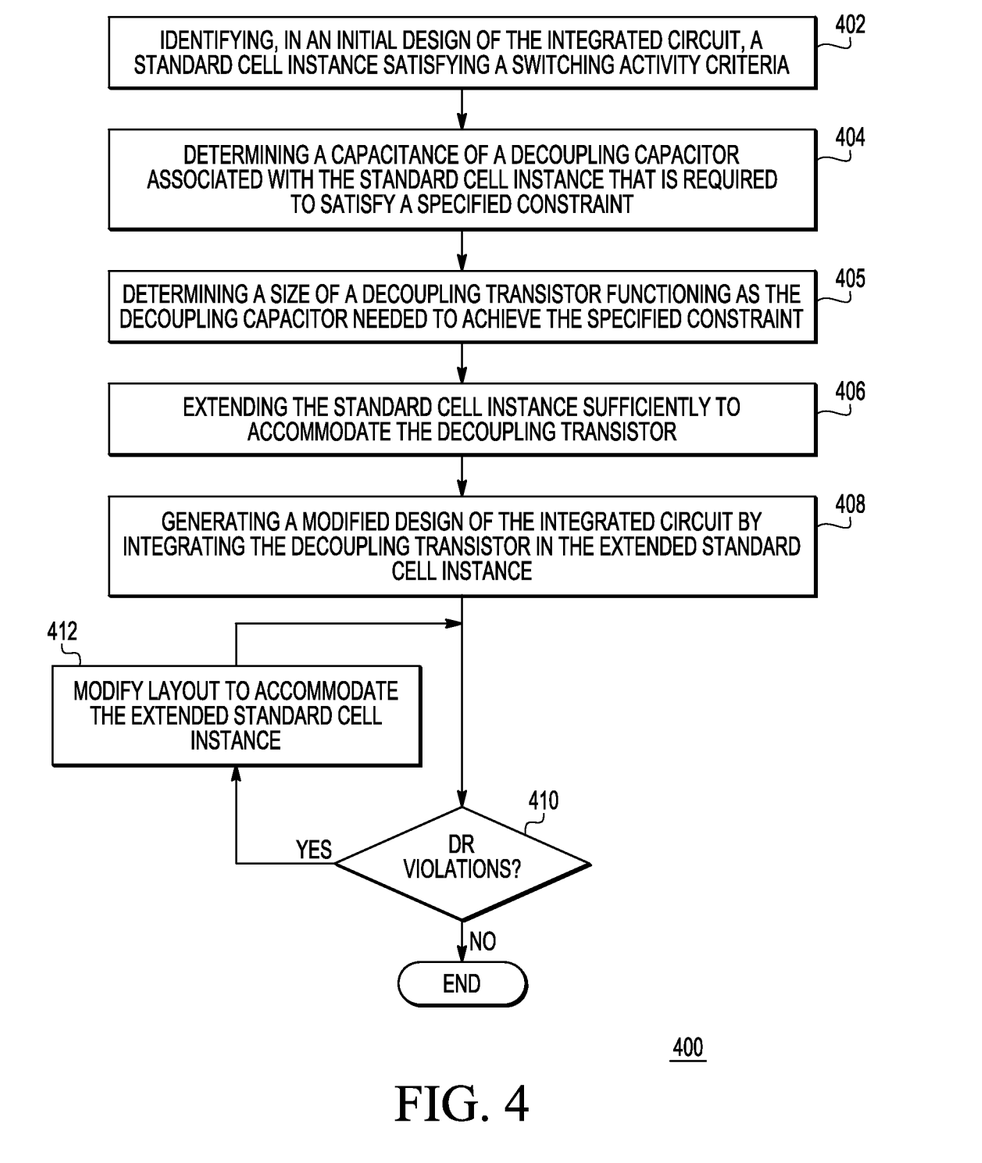
FIG. 4 is a flow diagram of selected elements of a method for incorporating decoupling capacitance in the design of an integrated circuit.

Turning now to FIG. 4, selected elements or operations of one embodiment of a method for provisioning an integrated circuit with decoupling elements is depicted. As depicted in FIG. 4, method 400 includes identifying (operation 402) in an initial design of an integrated circuit, a standard cell instance that satisfies a switching frequency or switching activity criteria. The switching activity criteria may be satisfied in cells that transition with every clock cycle or by other types of cells. Among the types of cells that may be identified in operation 402 are clock signal cells and sequential logic cells that are driven by a clock signal.

After identifying a cell instance that satisfies the switching activity criteria, the depicted embodiment of method 400 includes determining (block 404) a decoupling capacitance of a decoupling capacitor associated with the standard cell instance. The decoupling capacitance is the capacitance required to satisfy a specified constraint. A specified constraint for a given standard cell instance may indicate, as an example, a maximum permitted deviation of a supply voltage node. For example, a specified constraint may require that a power supply node, e.g., a node of a standard cell instance that receives a power signal, does not deviate from the nominal voltage of the power signal by more than a specified percentage. As an example, a constraint may specify 10% as a maximum deviation for a supply voltage node, i.e., specify that the supply voltage node vary no more than 10% from the supply voltage, VDD.

The capacitance of the required decoupling capacitor can be estimated, as described below with respect to FIG. 6, by modeling the standard cell instance as a circuit that includes a resistor connecting the supply voltage to a supply voltage node of the standard cell instance. The voltage node is modeled as being connected to a current source and a capacitance. By constraining the permitted voltage deviation and simulating the resistance and the current values, a value for the total capacitance of the standard cell can be derived. If the decoupling capacitor is estimated to comprise the bulk of the total capacitance, the size of the decoupling capacitor can be roughly equated to the size required to produce the indicated total capacitance.

Method 400 as depicted in FIG. 4 may further include determining (operation 405) a size of a decap transistor that is implemented to function as a decoupling capacitor with capacitance sufficient to achieve the specified constraint referred to previously. In operation 405, the capacitance requirement determine in operation 404 is translated into a physical dimension of a corresponding decap transistor. Deriving a size of a decap transistor based on a capacitance value may be influenced by various factors including, for example, the type and thickness of the gate dielectric, the doping of semiconductor regions on either side of the dielectric, the minimum spacing between adjacent gate electrode elements, and so forth.

After determining a size for the decap transistor, a standard cell instance may be extended (operation 406) sufficiently to accommodate the necessary decap transistor. In standard cell implementations, the dimensions of any gate electrode element traversing an active region of the substrate may have a standard dimension. The standard dimension may include a standard dimension for n-type active regions and a second standard dimension for p-type active regions.

In some implementations, gate electrodes 312 may have the smallest "length" permitted by the applicable fabrication process where length, in this context, refers to the distance a mobile carrier would traverse from drain to source or vice versa. More generally, although it may be desirable for purpose of implementing a decoupling capacitor to use gate electrode elements that are both wide and long, standard cell methodology may require or strongly impose the dimensions of the gate electrode elements that might be added to a cell. In these implementations, once the capacitance needed to comply with a specified constraint is determined and the size of a decap transistor corresponding to the required capacitance is determined, the primary variable available to implement the decap transistor is the number of gate electrode elements used to implement the decap transistor.

Again, as depicted in the standard cells illustrated in FIG. 2 and again in FIG. 3, an aspect of implementing decap transistors in the context of a standard cell design is the use of standard sized and spaced polysilicon gate electrode elements. In these embodiments, without control over the dimensions of any individual gate electrode element, attaining the necessary capacitance with a decap transistor may be achieved by using N gate electrode elements, each traversing an active region, where N is an integer greater than 0 and is determined by the capacitance per gate element and the required capacitance. To illustrate, if the capacitance required to decouple a standard cell instance sufficiently is approximately 10 µF, and each gate electrode element overlying an active region generates or otherwise contributes approximately 2.5 µF, then a minimum of four transistor gates may be required within the decap transistor to achieve the desired capacitance. As depicted in FIG. 3, the decap transistor 310 is designed into the initial implementation of the standard cell instance.

Although FIG. 3 depicts decap transistor being appended adjacent to one boundary 311 of standard cell instance 300, other implementations may form the decap transistor at an opposing end of standard cell 300, or on both ends of the standard cell. Moreover, to the extent that the standard cell configuration depicted in FIG. 3 imposes a limitation on which boundaries a decap transistor can be added, other implementations may not constrain the placement of polysilicon gate elements. For example, although the implementation of a standard cell instance as depicted in FIG. 3 is most suitable to appending decap transistors to either the left or right of the standard cell instance, other implementations be configured wherein decap transistors might be appended "above" or "below" the standard cell instance.

As indicated previously, decap transistor 310 as depicted in FIG. 3 is implemented as a floating poly decap transistor employing CMOS technology. In this implementation, transistor gate elements 312 traverse an n-type active region 313 and a p-type active region 315. In the embodiment depicted in FIG. 3, it is noted that the longitudinal dimension 316 of the p-type region 313 is greater than the length 318 of the second active region 315. Moreover, the depicted implementation of decap transistor 310 seeks to maximize the decoupling capacitance with the smallest footprint possible by using active regions of 313 and 315 that are substantially adjacent to one another by a separation that is minimum with respect to the design or fabrication design rules. By maximizing the area of the active regions 313 and 315, the physical implementation of a required capacitance will increase the area of the standard cell by the least amount achievable.

Electrically, the depicted implementation of decap transistor 310 might be modeled as a pair of capacitors in series between a supply voltage and ground with a relatively small resistance representing the gate electrode element included between the two capacitors. For example, the n-type active region 315 may be biased to VDD while p-type active region 313 is grounded or otherwise biased to VSS. Under these conditions, gate electrode structures 312 are effectively coupled to the underlying active regions through a capacitor produced by the gate dielectric that lies between the gate electrode elements 312 and the underlying active regions. As indicated previously, implementing decap transistor 310 with floating gate electrode elements as depicted in FIG. 3 beneficially reduces the footprint by eliminating the need to form contacts to polysilicon gate elements 312.

Returning now to FIG. 4, after extending a standard cell instance sufficiently to include enough gate electrode elements 312 to provide a decap transistor having the required capacitance, method 400 as depicted in FIG. 4 includes generating a modified design of the integrated circuit by integrating the decap transistor into the corresponding standard cell instance. (Operation 408).

Method 400 as depicted in FIG. 4 further includes performing additional design check steps including an operation 410 in which design rule (DR) violations are checked. If no DR violations are detected, method 400 concludes. If, on the other hand, the DR violation check in operation 410 identifies a design rule violation, method 400 as shown includes modifying a layout of the standard cell to conform the modified extended standard cell instances.

Figure 5:
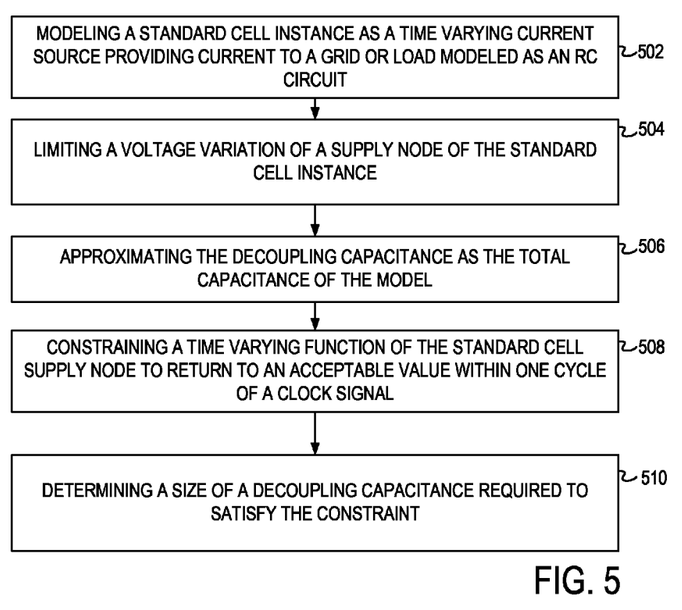
FIG. 5 illustrates one embodiment of a method for determining a decoupling capacitance required for a standard cell instance.

Turning now to FIG. 5, one embodiment of a method 500 suitable for determining the required capacitance for a given standard cell instance is illustrated. The FIG. 5 embodiment of method 500 includes modeling (operation 502) a standard cell as a time varying current source providing current to a load or power grid modeled as an RC circuit. Modeling the standard cell in its operating environment may further include constraining or limiting (operation 504) a voltage variation at a supply node of the standard cell instance to a specified value or to a specified percentage of a value. As described previously, a designer may specify that a supply node signal received by any standard cell instance vary not less than a specified percentage from the supply voltage and the limit imposed upon the design influences the size of the capacitor needed. Thus, as an example, the size of the capacitor required may reflect a decision to constrain voltage to vary no more than 10% of the supply voltage. While capacitors having greater capacitance would be able to accommodate a less stringently specified supply signal variation, the resulting capacitors would necessarily consume more area and thereby increase the cost of the device.

Figure 6A:
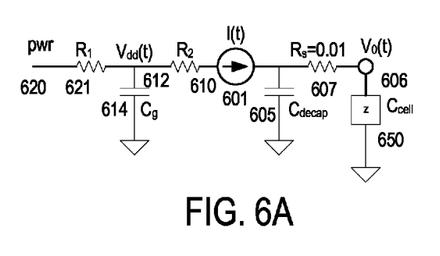
FIG. 6A and FIG. 6B illustrate embodiments of a circuit model suitable for use in determining a required decoupling capacitance for a standard cell instance.

A model 600 of the standard cell instance referenced in operation 502 operating in conjunction with its power grid or load is illustrated in circuit diagram format in FIG. 6A. As depicted in FIG. 6A, model 600 includes a time varying current source 601 providing a time varying current I(t) (602) to a node referred to herein as supply current node 604. Supply current node 604 is illustrated in FIG. 6 as being coupled to ground by decap 605. An Rs resistor 607 is illustrated connected between supply current node 604 and a standard cell supply node 606.

The FIG. 6 embodiment of model 600 illustrates current source 601 drawing current from Vdd(t) supply voltage node 612. Vdd(t) supply voltage node 612 is depicted coupled to ground by a global capacitance (Cg) 614. Cg 614 represents, in one embodiment, a global capacitance from neighboring cells, interconnects, and so forth. Vdd(t) supply node voltage 612 is illustrated in FIG. 6 connected to a power supply node 620 through R1 resistor 621. R1 resistor 621 models, in some embodiments, an equivalent resistance corresponding to upper metal layers R1.

Figure 6B:
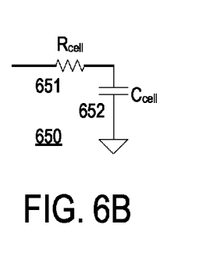

FIG. 6A illustrates standard cell supply node 606 providing a supply voltage V0(t) to a cell model 650, which as depicted in FIG. 6B, is represented electrically as an RC circuit including Rcell resistor 651 and Ccell capacitor 652. As depicted in FIG. 6A, conservatively assuming a negligible value of Cg 614 and Rs 607, Cdecap 605 is the only appreciable capacitance other than the capacitance of the standard cell itself (Ccell 652) available to stabilize standard cell supply node 606 from variations in Vdd(t) node 612. (see block 506).

$$\frac{V_{dd} - V_0(t)}{R} = I(t) - (C_{decap} + C_{cell})\frac{dV_0(t)}{dt}$$

Electrically, the circuit model of FIG. 6 is described by the following equation:

Integrating both sides of the equation above and re-arranging some terms yields:

$$\int_{t1}^{t2} \frac{V_{dd} - V_0(t)}{R} dt = Q_{avg} - (C_{decap} + C_{cell})\Delta V_0$$

If the specified voltage variation constraint (no more than 10% variation) is represented as: $\Delta V_0 = 10\%\ V_{dd}$ The equation may be solved by representing the voltage variation constraint as imposing (block 508) the following constraint:

$$V_0(t1+k\cdot T) = V_{dd} - \Delta V_0$$

which indicates that, for any value of time, t1, and supply node voltage $V_o$, the supply node voltage one clock cycle later be must returned to 90% of the supply voltage.

Method 500 as depicted in FIG. 5 further includes determining (block 510) a size of a decoupling capacitor required to achieve a capacitance of $C_{decap}$. For the embodiments described above in which the decoupling capacitor is implemented as a decap transistor, the size of the decap transistor is determined by dividing $C_{decap}$ by the product of the capacitance per additional gate electrode element and the area required to implement an additional gate electrode element the corresponding active regions.

Figure 7:
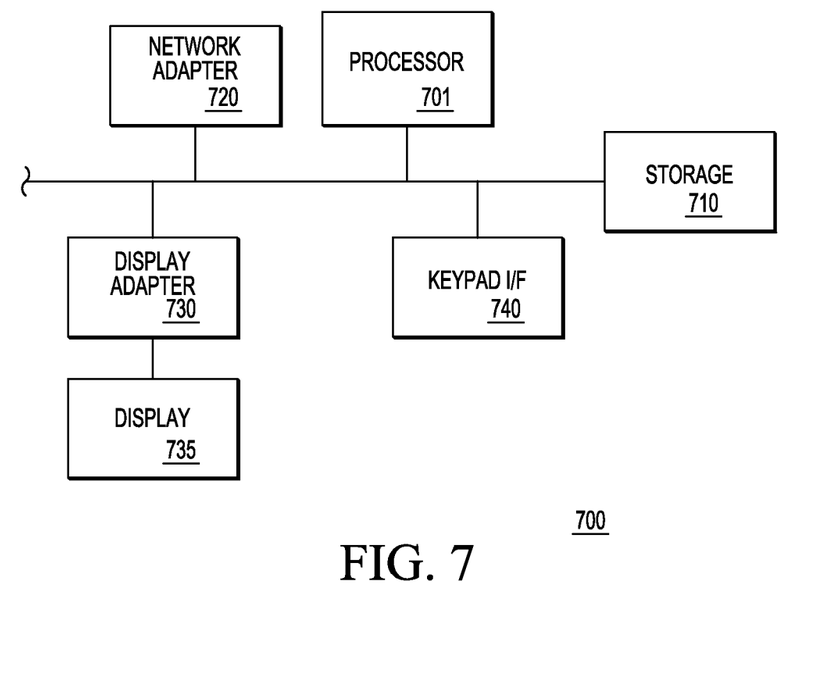
FIG. 7 depicts selected elements of an embodiment of a data processing network.

In some embodiments, the methods described with respect to FIG. 4 and FIG. 5 may be implemented or performed by a processor in a computer or other type of data processing system. In these embodiments, the method may be implemented as a set of processor executable introductions stored in a memory or other tangible storage element or storage medium of the data processing system or accessible to the processor. Referring to FIG. 7, selected elements of an embodiment of a data processing system 700 is depicted. System 700 may, in some embodiments, perform the methods depicted and described above with respect to FIG. 4 and FIG. 5 to identify standard cell instances to an integrated decap transistor should be added, to estimate the capacitance required for each such decap transistor, and to modify the design of the standard cell instance to accommodate the required decap transistor. Data processing system 700 may represent a laptop or desktop computer device, a server system, a mobile device having a wireless communication capability and encompassing devices such as tablet devices and smart phone devices.

Data processing system 700 as depicted in FIG. 7 includes a processor 701 having access to a memory or storage media 710. Storage 710 may store processor executable program instructions (not depicted in FIG. 7) that, when executed by processor 701, performing the methods described above. As depicted in FIG. 7, data processing system 700 may further include well-known data processing system elements including, as examples, a input/output or keypad interface 740 to enable a user to provide input to data processing system 700, a network adapter 720 to facilitate a connection between system 700 and a public network such as the Internet or a private network such as a local area network, a corporate Intranet, and so forth. Data processing system 700 as depicted in FIG. 7 still further includes a display adapter 730 and a display 735 suitable for generating images or other visible content. Data processing system 700 may, in other implementations, include elements not depicted in FIG. 7, exclude elements that are depicted in FIG. 7, or a combination thereof.

Although disclosed subject matter is described herein with reference to specific embodiments, various modifications and changes can be made without departing from the scope of the subject matter as set forth in the claims below. Accordingly, the specification and figures are to be regarded as illustrative rather than restrictive and the modifications and changes referred to are intended to be included within the scope of the present invention. Unless expressly stated otherwise, any benefits, advantages, or solutions to problems that are described herein with regard to specific embodiments are not intended to be construed as critical, required, or essential features or elements of any or all the claims.

Similarly, unless expressly stated otherwise, terms such as "first" and "second" may be used solely to distinguish between different elements such terms describe. Thus, these terms are not necessarily intended to indicate temporal or other prioritization of such elements.

What is claimed is:

1. A method of provisioning a semiconductor device with decoupling capacitors, the method comprising:
    identifying, from data indicative of an initial design of the semiconductor device, standard cell instances satisfying a decoupling criteria, wherein the identifying is performed by a processor;
    generating, by the processor, a modified design of the semiconductor device by integrating a decoupling capacitor in the standard cell instances satisfying the decoupling criteria to form modified cell instances,
        wherein the integrating the decoupling capacitor comprises extending a boundary of the standard cell instances and adding a decap transistor to form the modified cell instances, wherein the decap transistor implements capacitance of the decoupling capacitor,
        wherein each standard cell instance comprises two or more gate structures that are arranged in parallel and are spaced apart from each other by a standard spacing that is a uniform spacing predefined in the standard cell instances,
        wherein the decap transistor comprises at least a first gate structure and a second gate structure that are arranged in parallel with the two or more gate structures, wherein the first gate structure is spaced apart form an adjacent one of the two or more gate structures by the standard spacing and spaced apart from the second gate structure by the standard spacing,
        wherein the first and second gate structures each traverse at least one active region included within the modified cell instances, wherein the first and second gate structures implement an amount of the capacitance, wherein the amount of the capacitance is proportional to a combined area of the first and second gate structures overlying the at least one active region; and
    fabricating, by the processor, the device having the modified design.

2. The method of claim 1, wherein standard cell instances in the initial design lack decoupling capacitors.

3. The method of claim 1, wherein standard cell instances in the initial design not satisfying the decoupling criteria lack decoupling capacitors in the modified design.

4. The method of claim 1, wherein the decoupling criteria identify standard cell instances exceeding a switching frequency threshold.

5. The method of claim 1, wherein the integrating of a decoupling capacitor includes estimating the capacitance of the decoupling capacitor required to bring the standard cell instance into compliance with a specified constraint.

6. The method of claim 5, wherein the specified constraint comprises a voltage stability constraint indicating a maximum acceptable variation of a supply voltage node of the standard cell instance.

7. The method of claim 5, wherein a size of the decap transistor corresponds to an amount of the capacitance.

8. The method of claim 5, wherein the two or more gate structures are arranged in an order having a first end and a second end and wherein the adding the decap transistor includes adding N new gate structures to the order, wherein N is an integer greater than 0 determined based on the capacitance estimated, wherein the N new gate structures comprises the first and second gate structures.

9. The method of claim 8, wherein the N new gate structures and the two or more gate structures each have a same standard width and length that is a uniform width and length predefined in the standard cell instances.

10. The method of claim 8, wherein adding the N new gate structures comprises adding a first portion of the N new gates structures adjacent to the first end of the order and adding a remaining portion of the N new gates structures to the second end of the order, wherein each of the N new gate structures are spaced from each other and from either end of the order by the standard spacing.

11. The method of claim 8, wherein the decap transistor comprises a floating gate decap transistor and the N new gate structures comprise N floating gate structures.

12. The method of claim 8, wherein the decap transistor comprises a biased gate decap transistor and the N new gate structures comprise N biased gate structures.

13. The method of claim 8, wherein the plurality of gate structures include a complementary gate structure, wherein the complementary gate structure includes a gate structure comprising a first portion overlying a p-type active region and a second portion overlying an n-type active region.

14. A semiconductor device, comprising:
    a plurality of standard cell instances including noisy standard cells instances and quiet standard cell instances; and
    decoupling capacitors selectively integrated into a portion of the plurality of standard cell instances to form modified cell instances;
    wherein the portion of the plurality of standard cell instances into which the decoupling capacitors are integrated comprise the noisy standard cell instances,
    wherein each of the noisy standard cell instances comprises two or more gate structures that are arranged in parallel and are spaced apart from each other by a standard spacing that is a uniform spacing predefined in the plurality of standard cell instances,
    wherein the decoupling capacitors comprise decap transistors, each decap transistor having at least a first gate structure and a second gate structure that are arranged in parallel with the two or more gate structures, wherein the first gate structure is spaced apart from an adjacent one of the two or more gate structures by the standard spacing and spaced apart from the second gate structure by the standard spacing,
    wherein the first and second gate structures each traverse at least one active region included within the modified cell instances, wherein the first and second gate structures are determined based on a capacitance requirement of a corresponding standard cell instance, wherein the first and second gate structures implement an amount of capacitance indicated by the capacitance requirement, wherein the amount of capacitance is proportional to a combined area of the first and second gate structures overlying the at least one active region.

15. The semiconductor device of claim 14, wherein each decoupling capacitor comprises a first decap transistor appended to a first end of its standard cell instance.

16. The semiconductor device of claim 15, wherein each decoupling capacitor further comprises a second decap transistor appended to a second of its standard cell instance.

17. The semiconductor device of claim 14, wherein the decap transistors comprise floating gate decap transistors.

18. The semiconductor device of claim 14, wherein the decap transistors comprise biased gate decap transistors.

19. A method of designing an integrated circuit, the method comprising:

- identifying, in data indicative design of the integrated circuit, a standard cell instance satisfying a transient power criteria, wherein the identifying is performed by a processor;
- determining, based on a transient power characteristic of the standard cell instance, a decoupling capacitance requirement for the standard cell instance, wherein the decoupling capacitance requirement indicates a capacitance sufficient to bring the standard cell instance into compliance with a stability constraint on a supply voltage node of the standard cell instance, and wherein the determining is performed by the processor;
- adding, by the processor, a decoupling capacitor satisfying the decoupling capacitance requirement into the standard cell instance to form a modified cell instance,
    - wherein the decoupling capacitor comprises a decap transistor that implements the capacitance,
    - wherein the standard cell instance comprises two or more gate structures that are arranged in parallel and are spaced apart from each other by a standard spacing that is a uniform spacing predefined in the standard cell instance,
    - wherein the decap transistor comprises at least a first gate structure and a second gate structure that are arranged in parallel with the two or more gate structures, wherein the first gate structure is spaced apart from an adjacent one of the two or more gate structures by the standard spacing and spaced apart from the second gate structure by the standard spacing,
    - wherein the first and second gate structures each traverse at least one active region included within the modified cell instance, wherein the first and second gate structures implement an amount of the capacitance, wherein the amount of capacitance is proportional to a combined area of the first and second gate structures overlying the at least one active region; and
- fabricating, by the processor, the integrated circuit having the modified cell instance.

20. The method of claim 19, wherein the two or more gate structures are arranged in an order having a first end and a second end, and wherein the adding the decoupling capacitor includes appending a first portion of N transistor gates of the decap transistor adjacent to the first end of the order and appending a remaining portion of the N transistor gates adjacent to the second end of the order, wherein N is an integer greater than 0 and N is a function of the decoupling capacitance requirement, wherein the N transistor gates comprises the first and second gate structures, and where each of the N transistor gates are spaced from each other and from either end of the order by the standard spacing.

* * * * *